May 14, 1968     L. R. WOOD     3,383,294
PROCESS FOR PRODUCTION OF MISCH METAL AND APPARATUS THEREFOR
Filed Jan. 15, 1965
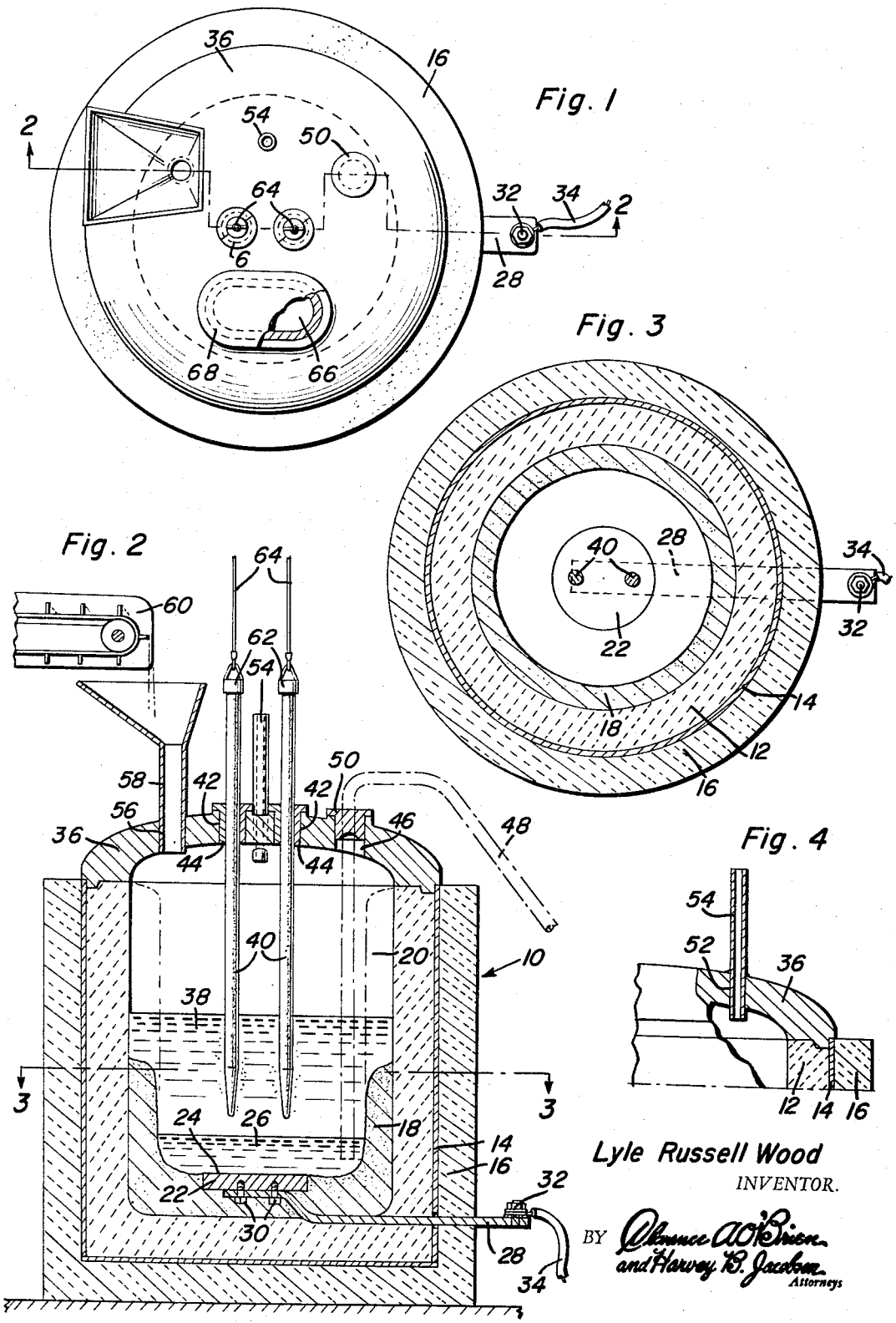
Lyle Russell Wood
INVENTOR.
BY Clarence A. O'Brien
and Harvey B. Jacobson
Attorneys

United States Patent Office 3,383,294
Patented May 14, 1968

3,383,294
PROCESS FOR PRODUCTION OF MISCH METAL AND APPARATUS THEREFOR
Lyle Russell Wood, Boulder City, Nev. (14146 Apple Valley Road, P.O. Box 965, Apple Valley, Calif. 92307)
Filed Jan. 15, 1965, Ser. No. 425,850
18 Claims. (Cl. 204—64)

This invention relates to an electrolytic process for the production of a composite of rare earth elements and an apparatus for carrying out such process. More specifically, this invention relates to a commercially economical method and apparatus for the manufacture by electrolytic means of a group of metallic elements generally designated as misch metal.

The metals of the rare earth group, as is generally known, comprise those elements with atomic numbers from 57 to 71 and include lanthanum, cerium, praseodymium, neodymium, samarium, europium, gadolinium, terbium, dysprosium, holmium, erbium, thulium, ytterbium, and lutecium. This group of transition elements within a larger transition element section on the periodic table have remarkably similar properties, always occur together in nature and are in most cases extremely difficult to separate to any significant purity. These characteristics are occasioned by the fact that the differing electron structure for the rare earth elements occurs within the anti-penultimate electron shell while their ultimate and penultimate electron groups are approximately identical.

The metals of the rare earth group occur in nature according to no specific ratio, which ratio varies in various specimens of source minerals obtained from different locations, and even from different parts of the same deposit. Typically, the metals occur in approximately the following weight percentage of the total rare earth group: lanthanum 25–35%, cerium 45–60%, praseodymium 6–12%, neodymium 3–6%, samarium and europium from very small amounts to a percent or two, and the others in very small quantities.

The metals of the rare earth group having a highly reactive character in their elemental form are of considerable commercial value in the metallurgical industry. A composite of certain of the more abundant metals of the rare earth group generally designated as misch metal is a mixture of certain rare earth metals, but not necessarily all of them, or even most of them. It is predominantly cerium, lanthanum, praseodymium and neodymium and may or may not have the other lanthanide elements present. Due to its highly reactive character, misch metal is a very useful agent for such purposes as making sparking alloys, as a scavenger in certain steel making processes, and as a metallothermic reducing agent and the like. However, it is just this high reactivity of the metals in the rare earth group or a mixture of them such as misch metal that makes it extremely difficult to obtain the metals in any high degree of purity in their elemental state.

Accordingly, it is the primary object of this invention to produce a composite mixture of the metals of the rare earth group in their elemental form of a relatively high purity.

A further object of this invention is to make the production of misch metal economically susceptible to commercialization.

An additional object resides in the use of an electrolytic process for the production of misch metal from naturally occurring mineral sources such as monazite and bastnasite.

A still further aspect of this invention resides in the design and details of construction of the electrolytic cell for carrying out the process of this invention.

An additional object resides in conditioning the available mineral sources for the rare earth elements preparatory to their introduction in the electrolytic cell for the production of certain metals in the rare earth group in their elemental form as misch metal.

The above and other objects are readily apparent from the following detailed description of the process and electrolytic cell comprising this invention. It has been found that the oxide of the lanthanide elements (rare earth oxide) can be successfully reduced by electrolytic means in an appropriate molten electrolyte. The appropriate electrolyte consists of the fluorides of the rare earth elements (rare earth fluoride) mixed with fluorides of the alkali metals such as sodium, potassium, and lithium and fluorides of the alkaline earth metals such as barium, strontium, and calcium. The fluorides of the rare earth elements predominate the electrolyte mixture, but it is necessary to have one or more alkali or alkaline earth fluorides present. Without a pedominance of the rare earth fluorides, it is not possible to recover the misch metal and without the inclusion of at least one alkali or alkaline earth fluoride, the melting point of the electrolyte mixture is not at a sufficiently low temperature to permit the present invention to be carried out. The addition of more than one of the alkali or alkaline earth fluorides helps to prevent the reduced rare earth metals from reacting with the electrolyte.

While a wide range of proportions for the various fluorides comprising the electrolyte mixture have been successfully used, the most desired proportions are within the following ranges by weight: 60%–75% fluorides of the rare earth elements; 8%–18% alkali fluoride; and 8%–18% alkaline earth fluoride. The desired qualities for a suitable electrolyte include a low melting point for the mixture such that a relatively thin fluid is produced at temperatures below 900° C. and a resistance to attack by the reduced misch metal when the metal is satisfactorily protected by a reasonably low cathodic voltage. Compositions for the electrolyte mixture comprising between 60% and 75% rare earth fluoride, with innumerable combinations of the alkali fluorides and alkaline earth fluorides, has properties capable of meeting the above mentioned qualifications.

Since molten misch metal and the above described molten fluoride electrolyte react rapidly with each other except when the metal has a cathodic potential protection of about three volts or more applied to it, it is necessary that an appropriate potential be applied to the produced misch metal so long as it is in contact with the molten fluoride electrolyte.

Inasmuch as rare earth fluoride is a mixture of the fluorides of the rare earth elements, the fluoride is readily obtained by various chemical processing of common rare earth compounds, such as by any normal solution or pyrochemical process for making such a compound. A typical example producing rare earth fluoride suitable for the electrolyte in the present process is the residue resulting from the treatment of bastnasite by hydrochloric acid in the making of rare earth chloride (whether or not the bastnasite has been calcined). If only a moderate excess of hydrochloric acid is used to dissolve the carbonate portion (or oxide portion if the bastnasite has been calcined), the residue which remains is rare earth fluoride. A commonly available bastnasite yields approximately 25% of its weight as rare earth fluoride by this method. It is essentially a composite of the fluorides of cerium, lanthanum, praseodymium, neodymium and samarium. The amount of samarium, and of the elements of higher atomic number than samarium, is small, and as such prevents the recovery of these elements in the misch metal unless their concentration in the electrolyte is increased.

The fluorides of alkali metals, such as sodium, potassium, and lithium, and alkaline earth metals, such as calcium, strontium, and barium, are well known and commercially available products.

Rare earth oxide is an oxide of the mixture of the lanthanide rare earth elements. The element cerium as an oxide is in the tetravalent form whereas the other lanthanide elements as oxides are in the trivalent form. The rare earth oxide feed which is used in the present invention may be made by any standard chemical process which produces a mixture of the oxides of the lanthanide elements. Rare earth oxide is most easily made by treating the mineral monazite with sodium hydroxide. Monazite, which is a composite of the phosphates of the rare earth elements is fed into molten sodium hydroxide. The reaction products are rare earth oxide, trisodium phosphate, and water according to the following two reactions (depending upon the difference between the tetravalent cerium and the trivalent other rare earth elements):

$$4CePO_4 + 12NaOH + O_2$$
$$4CeO_2 + 4Na_3PO_4 + 6H_2O$$

which applies to the cerium portion and $$2RePO_4 + 6NaOH$$
$$Re_2O_3 + 2Na_3PO_4 + 3H_2O$$

where Re refers generally to the other lanthanide elements.

The reaction is carried out by melting sodium hydroxide in an appropriate vessel, such as iron or the like, and heating it to at least about 350° C. The monazite is fed into this molten sodium hydroxide. The reaction is active and the water produced as steam causes considerable frothing. The monazite can be fed into the reaction vessel containing the sodium hydroxide at a rate which control of the frothing permits, and it is quickly and completely decomposed. An excess of sodium hydroxide is used to maintain the melt in a fluid condition. It has been found that approximately one and a half times as much sodium hydroxide by weight to the monazite introduced is necessary for the reaction to maintain the requisite melt fluidity as the reaction progresses.

Similarly, the feed to the cell may be rare earth carbonate and in this composite the cerium as well as the other lanthanides are trivalent. The carbonate as would be expected decomposes upon contact with the hot electrolyte, and inasmuch as the atmosphere surrounding the electrolyte is oxygen deficient the cerium portion of the rare earth carbonate during the decomposition remains in the trivalent state and dissolves in the electrolyte as trivalent oxide.

Another mineral source for the rare earth oxide is such mineral compositions as bastnasite and other fluocarbonate substances. However, in the case of such fluocarbonate substances only that part of the mineral in which the lanthanides are equivalent to the carbonate is available for the electrolysis, and the remainder is combined with the fluorine to effectively form rare earth fluoride. A commonly available bastnasite is approximately 75% rare earth carbonate and 25% rare earth fluoride. The carbonate portion of this mineral is similar to the carbonate discussed in the preceding paragraph. When bastnasite or other similar substances are used as the feed in the cell there is a continual accumulation of rare earth fluoride which must be taken into consideration.

The fluorides of the rare earth, alkali and alkaline earth elements are the electrolyte for the cell and are used only as a solvent for the rare earth oxide. The fluorides do not enter into the electrolytic reaction within the cell. The electrolyte will not carry more than a nominal amount of direct current unless rare earth oxide is present therein. While it is not intended to be restricted by this analysis, it is believed the rare earth oxide is ionized in the electrolyte, and the potential across the cell moves the metal ions to the cathode where they are reduced to elemental metal and moves the oxygen ions to the anode.

The rare earth oxide is fed into the electrolyte at approximately the same rate that its electrolytic decomposition occurs in the cell. If more is fed into the electrolyte than will dissolve in it, the excess settles to the bottom of the cell whereby it may become entrapped in the produced misch metal. If less rare earth oxide is fed into the cell than is being decomposed, the current drops to match the amount of oxide available. Electrolyte which is impoverished in the rare earth oxide will not carry a useful amount of current, and an anode effect occurs to stop the current flow until more oxide is added. Accordingly, the amount of rare earth oxide dissolved in the electrolyte is kept between a minimum amount for the current requirements and the saturation point of the electrolyte for the dissolved rare earth oxide.

The voltage which can be applied to the electrolytic cell for carrying out the electrolytic process, and the current which can be forced through it, are dependent upon the temperature of the electrolyte. At temperatures slightly above the melting point of the electrolyte approximately three volts can be applied. An attempt to increase the voltage produces anode effect and restricts the current flow through the cell. On the other hand, it has been found that at temperatures of about 950° C. an appropriate cell can be operated at approximately six volts and anode current densities of about 30–50 amperes per square inch can be used.

With these higher temperatures, and with the correspondingly higher voltages and currents, a cell can be made large enough to let the heat generated by the electric current keep the electrolyte up to the operating temperature. At lower temperatures, however, or in cells which have a small electrical capacity compared with heat loss involved, there is not enough electrical energy supplied by the electrolytic current over and above that needed for the electrochemical reaction to supply enough heat to maintain a high enough temperature. In such event, additional heat must be externally supplied. In starting the operation of an appropriate cell, external heat may be applied to cells of small size. However, in large cells external heat is not practical and some other means must be employed such as using a carbon resistor in the cell until the proper temperature is reached.

Inasmuch as water and water vapor react unfavorably with the electrolyte and misch metal, the fluoride and oxide substances introduced into the cell must be anhydrous.

Further details of the process for the electrolytic production of misch metal and the details of construction and operation for the electrolytic cell are more fully hereinafter described and claimed, reference being had to the accompanying drawings forming a part hereof, wherein like numerals refer to like parts throughout and in which:

FIGURE 1 is a top plan view of a typical electrolytic cell adaptable for the process of this invention;

FIGURE 2 is a vertical cross-sectional view taken substantially along the line 2—2 of FIGURE 1;

FIGURE 3 is a horizontal cross-section view of the cell along the line 3—3 of FIGURE 2; and FIGURE 4 is an elevated view partially broken away in cross section showing the cover and container wall engagement substantially at the point in the cover where the vent is positioned.

Referring to FIGURE 2 in which the numeral 10 designates generally an electrolytic cell comprising a part of this invention, the main body 12 of the cell 10 is made of carbon or any other suitable material. In this regard, the molten fluorides used as the electrolyte for the process comprising this invention are highly corrosive and are difficult to hold except in a container made of carbon, graphite, rare earth oxyfluoride (as described in my pending application, Ser. No. 363,190, filed Apr. 28, 1964, now U.S. 3,341,437) or within some other container which is lined with an unmolten layer of the same composition as the melt. A main body made of carbon can be formed by ramming a hot coke-pitch-tar mixture into a steel shell, such as at 14, in a manner which is standard procedure in metallurgical plants. The coke-pitch-tar mixture is then baked to carbonize the pitch and tar and unite the carbon into one piece. The steel shell 14 is any sort of casing of sufficient strength to hold the cell and allow formation of the cell body therein. It is surrounded by a thermal insulation 16 for cells of reasonable magnitude. In cells which are relatively small there must be a provision for heaters to be installed between the steel shell 14 and the insulation 16, or else the setting of the cell must be made in a furnace to permit use of a fuel heat source.

Inasmuch as molten misch metal is extremely corrosive, it is desirable in the cell 10 to have a non-reactive lining 18 within the mail cell body 12 such that when the level of the molten misch metal is varied to insure contact only with the lining. Reaction of the molten misch metal with a reactive lining is thus avoided.

While molten misch metal can be held for limited periods in cast iron, it dissolves some of the iron. It can also be held in molybdenum and tungsten containers for a considerable time and in lime or magnesia crucibles for a reasonable period of time. However, it has been found that the most desirable non-reactive substance for use in the cell comprising a part of this invention is rare earth oxyfluoride. Accordingly, the lining 18 is most preferably constructed of rare earth oxyfluoride. The lining 18 is made in the form of a bowl in which the mich metal can be collected. It is of sufficient capacity to hold all the metal which will accumulate between tappings of the metal. The lining 18 can, of course, extend the complete vertical height of the main cell 12 as at 20, inasmuch as it resists attack by the molten fluorides comprising the electrolyte of this invention; or the rare earth oxyfluoride can be used in the first instance as the composition for the main body 12. Furthermore, the changing level of the junction between the misch metal and the electrolyte as the misch metal accumulates and is then withdrawn does not in any way effect the rare earth oxyfluoride. Additionally, rare earth oxyfluoride is inert to oxidation above the molten electrolyte and as such is an excellent material for the cell construction. In any event, its use in the misch metal holding part of the cell is essential.

The method of manufacture of rare earth oxyfluoride is described in my above identified pending application for patent. The solid form of the rare earth oxyfluoride as made in accordance with that disclosure is crushed and pulverized. The comminuted rare earth oxyfluoride is then admixed with an amount of rare earth oxide equal to approximately 5% of its weight. This pulverized mixture is compressed under high pressure into bricks, or shapes, and these are then heated to 1100° C. or more for a day or two. At this high temperature the material initially becomes pasty but with the continued heating the shapes set up hard. In this form they may be set as a lining for the electrolytic cell, using the pulverized mixture between the individual blocks. On heating to the sintering temperature for the necessary time the lining becomes a hard monolith of rare earth oxyfluoride.

In a case of cells of small size, it is possible to tamp the rear earth oxyfluoride into the cell to be lined, or into a form to shape it while it is in a pasty condition upon being initially raised to the high temperature. Once tamped into a dense form and upon continued heating at temperatures above 1100° C., it sets up hard.

The cathode 22 is relatively flat in shape and is embedded at the interior of the bottom of the rare earth oxyfluoride lining 18 such that the relative flat surface 24 is fully exposed to the interior of the cell and in contact with the molten misch metal 26 which is formed. The cathode is made of any suitable material such as cast iron, molybdenum, or tungsten, the latter two of which are more rafractory. The cathode 22 is in contact with an iron or other connecting bar 28 running to the outside of the cell. The contact is maintained by suitable connecting means such as a pair of bolts 30 or other manner of connection. The portion of the bar 18 exterior of the cell is equipped with a conventional wire contact means 32 to which is connected an electrical wire 34 associated with the cell power source (not shown). Inasmuch as the cathode 22 and associated bar 28 with connecting means 30 must necessarily be embedded in the rare earth oxyfluoride during the formation of the lining 18, the cathode is covered with carbon, coke, or other protective material to prevent its oxidation during the sustained high temperature for sintering and hardening the rare earth oxyfluoride.

The cell 10 is provided with a cover 36 having a diameter substantially equal to the diameter of the shell 14. The presence of the cover 36 allows the cell to work better by conserving heat and by confining the off gases of the cell in order to maintain a non-oxidizing atmosphere over the electrolyte 38 and around the hot carbon anodes 40 and cell body 12. It is possible at times to form a crust of electrolyte above the melt which serves as a cover. However, it is generally better to use a separate cover of an appropriate composition, such as fire clay, asbestos-cement board, or magnesia block. Since the off gases of the cell are not corrosive and any splash of electrolyte onto the cover rapidly freezes, there are no corrosion problems existing in connection with the cover composition.

The cover 36 has an opening 42 for the anode 40, or for each anode 40 if more than one is used. The anodes 40 are moved up and down and so the openings 42 are sufficiently large to allow the necessary motion. A split bushing 44 of suitable material can be utilized between the anode 40 and the opening 42 in the cover 36 in order to allow removal of an anode even though electrolyte may be adhering to it.

Another opening 46 is provided in the cover 36 for a tapping device siphon 48. The opening 46 is large enough to allow easy manipulation of the siphon therethrough. The opening 46 is covered as by plug 50 when the siphon 48 is not in use. Another opening 52 in the cover 36 is fitted with a piece of tubing 54 which acts as a vent to remove the off gases from the cell. Since the gases contain carbon monoxide, the vent discharge should be to the atmosphere. Some control of the draft on such a vent is necessary to prevent sweeping the space above the melt with fresh air, and such is the purpose for employment of the tubing 54.

Still another opening 56 in the cover 36 is provided for insertion of a conventional funnel 58 to permit introduction of the feed material into the cell. Rare earth oxide is fed continuously into the cell by any type of dry feeder 60 which can be regulated to the proper rate of feed. The cover also includes an opening 66 which is used as an inspection hole and is covered by a top 68 or the like except when open for inspection or probing.

Inasmuch as molten misch metal has a specific gravity in the range of about six and the fluoride electrolyte has a specific gravity usually within the range 4½–5, the molten misch metal which is produced in the cell gravitates to the bottom and collects in the bowl-like rare earth oxyfluoride lining 18, as at 26. In order to remove the formed misch metal from the cell it has been found that a vacuum siphon is most successful. While the practice of the vacuum siphon is similar to the method utilized in other metallurgical processes, certain considerations make it unique to its application in this process.

In view of the high densities of the molten misch metal and fluoride electrolyte, there is a practical elevational limit to which the misch metal can be lifted above the top surface of the electrolyte by vacuum. No problem has been experienced in lifting the misch metal up to 2½ feet above the top of the electrolyte. The siphon pipe 48 can be made of molybdenum if high purity misch metal is desired, but the molybdenum must be protected against oxidation at the high temperatures employed. Iron can be used for the siphon if the siphon is cathodically protected as it is immersed in the electrolyte and if a small amount of iron contamination is tolerable to the misch metal purity requirement. The amount of contamination is very small in view of the short contact time between the iron and the misch metal running through it.

In tapping the misch metal from the cell, the siphon pipe is first filled with electrolyte as it is dipped into the cell and this is sucked over first. If the receiver is of cast iron, the electrolyte and first metal are chilled and frozen so that there is negligible reaction between the two rare earth composites in the receiver. After completion of the siphoning, the pipe full of misch metal merely drains back into the metal pool at the bottom of the electrolytic cell when the vacuum is broken to stop the flow.

While misch metal oxidizes rapidly at elevated temperatures, the vacuum of the tapping system does not allow sufficient oxygen contact with the metal to let it oxidize appreciably. Even when the vacuum is broken for stopping the flow into the receiver, the oxidation is confined to the surface of the metal in the receiver. This small oxidation may also be prevented by breaking the vacuum with an inert gas. The misch metal must be allowed to cool within the receiver or else unloaded in an inert atmosphere, inasmuch as hot misch metal will oxidize progressively and fairly rapidly.

The anode or anodes 40 are constructed of any suitable material such as carbon, graphite or the like. They are suspended into the cell through openings 42 in the cover 36 with associated split bushings 44. The anodes are supported by support and electrical connector members 62 which are in contact with any conventional electrical conduits such as electric wire 64. Anode current densities as high as about 30–50 amperes per square inch may be used. The anode or anodes should be operated close to the misch metal pool in order that nearly all of the current tends to flow to the metal pool rather than the cell walls. The positioning of the anode or anodes is important inasmuch as misch metal tends to deposit on any cathodic surface in the electrolyte proportional to the current flowing to that surface. If it deposits on carbon, rare earth carbide is formed. If the misch metal deposits continuously onto a vertical or steep non-reactive surface, such as a surface under the influence of a cathodic protection voltage, the misch metal will run down the surface without much tendency to adhere to it. The moment it loses its contact with the cathodic surface it reacts with the electrolyte resulting in a loss of metal, a fouling of the electrolyte, and consequently a loss of electrolyte. Accordingly, inasmuch as the cathode is confined to the horizontal surface of the collected pool of misch metal, the anode or anodes should be positioned as close to this pool as possible in order to ensure that the current flows preferentially to the pool and not to the cell walls.

A continuous flow of electric current is necessary in the cell to prevent the reaction between the misch metal and the electrolyte. If rectified single phase alternating current is used as the power supply, provision for cathodic protection of the misch metal is necessary during the off portions of the cycle. A generator floating on the direct current circuit tends to provide this cathodic protection without having to supply any appreciable energy. Rectified polyphase alternating currents, which are by far the most common direct current circuits, do not have any off time of the cycle to protect against. In order to take advantage of higher voltage direct current circuits, a number of cells may be connected in series.

EXAMPLE I

An electrolytic cell was built on the plan of FIGURES 1 through 4. The sheet metal container 14 was 14 inches in diameter and 16 inches deep. The interior of the cell 12 was two inches thick of a mixture of 25% pitch and 75% petroleum coke rammed into place hot with a light sheet metal form to shape its interior. The form was removed when the ramming was complete. The temperature inside was gradually raised by an electric heater until the pitch was carbonized and the liner was a solid block of carbon with an inside diameter of 10 inches and an inside depth of 14 inches. The molybdenum cathode which was built into it was covered with carbon during the cooking to prevent its oxidation.

Granulated rare earth oxyfluoride which had been mixed with 5% of its weight of rare earth oxide was then placed in the bottom of the cell. An open ended sheet iron cylindrical form was placed on this, concentric with the inside of the carbon cell, and the space between the form and cell filled with the granulated rare earth oxyfluoride-rare earth oxide mix, the molybdenum cathode being still covered with carbon. By means of passing high currents through one inch diameter carbon rods the inside temperature of this assembly was brought up to about 1100° C. at which point the rare earth oxyfluoride mixture was pasty. The pasty mix was rammed into a solid mass in the bottom of the cell and also between the sheet iron form and the inside of the carbon cell. The sheet iron had very little strength at this temperature but it was sufficient to serve as a guide for the ramming.

The electric heating was reinstalled in the cell and the temperature maintained between 1100° and 1200° centigrade for two days. During this heating the cell was kept covered to prevent the carbon from burning.

At the end of two days it was found that the rare earth oxyfluoride was hard, even at these elevated temperatures. The heat was removed and when the cell was cool enough to work with the iron form, which by this time was nothing more than a brittle lining of iron oxide, was removed. The carbon protector was removed from the cathode.

The bottom of the cell was now a cup of rare earth oxyfluoride, 8 inches inside diameter, and about 3 inches deep. The carbon cell above it was 10 inches inside diameter and its rim was 9½ inches above the top of the rare earth oxyfluoride cup.

A single 2 inch diameter graphite anode was suspended through the hole in the cover. A feeder for the material to be reduced to misch metal was set up over the cell with a feed pipe through the cover into the cell.

The rare earth oxide required for inclusion in the cell lining and for reduction to misch metal is produced by the treatment of monazite with an excess of molten sodium hydroxide. The specific example embodied herein is given in grams, although it will be understood that the relative proportions set forth may be utilized in processing larger amounts of monazite.

100 grams of sodium hydroxide were melted and held at 350° C. Monazite was added at a controlled rate until 79 grams had been added. At this point the melt began to become viscous. It was found that when the melt became viscous that part of the monazite added was not decomposed.

When 70 grams of monazite were added to the 100 grams of molten sodium hydroxide the melt remained fluid, the reaction on the monazite was complete, and the rare earth oxide settled easily to the bottom of the melt but could be stirred up into it by agitation.

When the reaction products were allowed to freeze it was found that they weighed 163 grams, the loss of weight being due to the evolution of steam during the process. It was further found that when this charge was digested with 250 ml. of hot water, and subsequently washed with another 250 ml. of hot water, and the residue of rare earth oxide dried that it weighed 50 grams.

It was further found that when this 250 ml. of hot water used to digest the frozen charge was allowed to cool that 100 grams of crystals of dodecahydrated trisodium phosphate was recovered. The remaining solution of sodium hydroxide was heated until the water was driven off and the dehydrated sodium hydroxide, along with that unrecovered trisodium phosphate, melted, and the melting point was very close to the melting point of the original sodium hydroxide.

A run was made by melting 2.7 kilograms of sodium hydroxide in a metallic vessel and feeding monazite into it at the rate of 200 grams per hour. At the end of 9 hours the monazite was about 70% of the amount of sodium hydroxide used so each hour thereafter there was added an additional 285 grams of sodium hydroxide to keep the ratio between it and the monazite the same. This was continued for 20 hours after which the process was shut down. 2340 grams of rare earth oxide were recovered.

It should also be noted that while 250 ml. is a suitable amount of water for treating the 163 grams of reaction product from 100 grams of sodium hydroxide and 70 grams of monazite (this is the same as 6 lbs. of water for 1.68 lbs. of monazite and 2.4 lbs. of sodium hydroxide) it is not meant to be a definitive quantity and variations from that may be found more economically usable.

This process could easily be made into a continuous operation. Agitation suspended the rare earth oxide in the fluid melt, and by such agitation the reacting components being fed continuously at their proper rate and reacting rapidly could be allowed to continuously displace overflow into the proper amount of water for their digestion. Cooling, crystallization and separation of trisodium phosphate, and discharge of the sodium hydroxide solution to an evaporator could also easily be made into a continuous process.

The anhydrous rare earth oxide that was prepared from the monazite is mixed with commercially available anhydrous fluorides of the alkali metals, fluorides of the alkaline earth metals to prepare an appropriate electrolyte, and rare earth fluoride.

The electrolytic cell described above was charged with an electrolyte mixture of 65.7% rare earth fluoride, 10.8% barium fluoride, 13.5% lithium fluoride and 10.0% rare earth oxide. The electrolyte was melted by using a 1″ diameter carbon rod held against the graphite anode and with a low-voltage high-current power supply connected to them. As the electrolyte melted down additional electrolyte was added until a pool about 7 inches deep, containing 36 kilograms, filled the cell bottom. As soon as the molten electrolyte made electrical contact with the cathode a DC voltage was applied between the cathode and anode and maintained at as high a value as possible without starting anode effect. At first this voltage was about 3 volts, but as the temperature increased the voltage could be raised until at about 950° C. the voltage could be maintained at 5.6 volts. The time required to arrive at 950° C. was five hours. 600 amperes was forced through the cell by the 5.6 volts, and bastnasite for reduction to misch metal was fed at the rate of 2.4 kilograms per hour.

At the end of six hours run the metal was tapped. The vacuum tapping device was prepared by preheating the suction pipe, and connecting it by a current limiting connection to the cathode so that it would have cathodic protection as it was immersed into the electrolyte. Vacuum was applied briefly then relieved and the receiving chamber allowed to cool after the suction pipe was withdrawn fro mthe cell. No attempt was made to exhaust all of the misch metal pool in the bottom of the cell. Tappings were undertaken each six hours.

At the end of 13 hours the electrolyte started to get viscous, from the build up of rare earth fluorides to the point of stopping the cell's operation. To keep the cell going some of the electrolyte was ladled out of the cell and replaced with a mixture of barium fluoride and lithium fluoride in the same ratio as in the original mixture. This was 10.8 grams of $BaF_2$ for each 13.5 grams of LiF. This was continued until the electrolyte was again fluid. It was done in small increments to prevent chilling the electrolyte in the cell, and was done whenever it was felt that the electrolyte started to get syrupy. The reason for this was that the bastnasite feed continually added 25% of its weight as rare earth fluoride and it was necessary to bleed off part of the electrolyte and replace it with the barium and lithium salts to prevent the concentration of rare earth fluoride from becoming too great and creating a viscous electrolyte.

This cell was run for two days. At the end of that time it was allowed to freeze up, then it was broken up for examination. Everything about it indicated that with a continuing supply of fresh electrolyte that it could have been kept in operation. As pointed out in my disclosure, the simultaneous operation of a rare earth oxyfluoride cell such as disclosed in my copending application S.N. 363,190 to remove rare earth fluoride would allow the rejuvenation of the removed electrolyte and continuous operation of the cell.

In this run, 39 kilograms of misch metal were drawn off by syphon. There was some metal in the cell when it was shut down. The average current was about 600 amperes, the average voltage about 5.6 volts. This represents 3.36 kilowatts, or a total of 162 kilowatt hours after the start up. This is 4.15 kilowatt hours per kilogram of misch metal. The metal collected on the molybdenum cathode was a soft silvery white metal which would tarnish within a few minutes after being scraped bright. An analysis of this metal from one experimental run, by the U.S. Bureau of Mines at Reno, showed:

| | Percent |
|---|---|
| Cerium | 54 |
| Lanthanum | 31 |
| Neodymium | 9.4 |
| Praseodymium | 3.3 |

Iron, silicon and aluminum were present in quantities less than one percent, and all other elements were in extremely small amounts if detectable.

When the metal was collected on a steel cathode it was found to be crystalline and harder, and also more resistant to tarnish. No analysis was made of this sort of metal but it is felt that the misch metal dissolved enough of the iron to impart these characteristics to it.

EXAMPLE II

The rare earth oxide prepared from monazite, as described in Example I was fed into an electrolytic cell made of a graphite crucible about 6 inches inside diameter and 10 inches inside depth. A 2½″ malleable pipe cap in the bottom of the crucible was the cathode and an iron bar running up inside against the wall of the crucible connected this cup-like cathode to the direct current power supply. A one-inch diameter graphite anode was held so that it projected down into the center of the crucible with its lower end about even with the top rim of the cathode cup. The crucible was set in an electrically heated furnace and an electrolyte composed of 14.2% lithium fluoride, 17.2% barium fluoride, and 68.6% rare earth fluoride was melted in it. Nine kilograms of this electrolyte were used. A cover was loosely fitted over the opening in the furnace to prevent oxidation of the crucible and of the anode and cathode connector.

When the electrolyte was melted, and at about 800° C., it was found that when about 3 volts DC were applied to the electrodes that a few amperes could be forced between them. An attempt to raise the current by increasing the voltage resulted in anode effect. When the temperature was at 830° C. about 100 grams of rare earth oxide was put into the cell and it was found that immediately the voltage could be raised to 4 volts and the current could be 100 amperes. When it was attempted to force more amperes through the cell by raising the voltage anode effect set in again and stopped the current. Addition of more rare earth oxide did not change this.

The rare earth oxide feeder was set to feed at a rate of 185 grams per hour and it was found that with 4 volts 100 amperes could be continuously forced through the cell. The 185 grams per hour was the calculated amount to supply metal for the 100-ampere rate. This condition remained stable for one-half hour, after which the temperature was raised.

It was found that upon raising the temperature to 950° C. (which required one-half hour to reach from the 830° C. temperature) that the voltage could be raised and more amperes could be forced through the cell. The feed rate of rare earth oxide was also raised in proportion to the amperes. At 950° C. six volts could be applied to the cell forcing 250 amperes through it. The rare earth oxide feed rate was increased to 465 grams per hour during this time. It was found that under these conditions the power to the furnace had to be turned off as the energy supplied to the electrolytic cell was sufficient to maintain the temperature at 950° C.

At the end of two hours at this rate the cell was shut down by stopping the feed of rare earth oxide and reducing the voltage to 3 volts for cathodic protection of the metal during the freeze-up of the cell. Upon breaking the cell open it was found that 930 grams of misch metal had been produced. This represents a recovery of 1.43 grams of misch metal for each ampere-hour.

EXAMPLE III

The process of Example I was repeated with a change in the electrolyte used and the input to the electrolytic cell. Rare earth oxide produced by the treatment of monazite with sodium hydroxide was introduced into the electrolytic cell instead of bastnasite.

The electrolyte utilized in this run was composed of 14.2% lithium fluoride, 17.2% barium fluoride, and 68.6% rare earth fluoride.

The input of rare earth oxide is about one-half of what the bastnasite input to the cell would be because the lanthanide portion of the rare earth oxide available for reduction to metal is about 83.3% while the bastnasite only contains about 43% lanthanide portion which is available for reduction to misch metal.

With an input of rare earth oxide into the electrolytic cell the accumulation of rare earth fluoride does not take place. Accordingly the electrolytic cell may be run for extended periods of time without any significant increase in the viscosity of the electrolyte in which the rare earth oxide is dissolved.

The cell was operated at about 950° C. at 6 volts with an anode current density of about 30–50 amperes per square inch. The output of a cell of this type with an input of rare earth oxide is about 1.43 grams of misch metal for each ampere-hour input of power.

EXAMPLE IV

The process of Example I was repeated with the substitution of an electrolyte composed of 67.0% rare earth fluoride, 17.0% barium fluoride, and 16.0% lithium fluoride.

EXAMPLE V

The process of Example I was repeated with the substitution of an electrolyte composed of 77.3% rare earth fluoride, 12.7% barium fluoride, and 10.0% lithium fluoride.

EXAMPLE VI

The process of Example I was repeated with the substitution of an electrolyte composed of 60.8% rare earth fluoride, 12.3% barium fluoride, and 26.9% lithium fluoride.

EXAMPLE VII

The process of Example I was repeated with the substitution of an electrolyte composed of 60.8% rare earth fluoride, 12.3% barium fluoride, 13.9% lithium fluoride, and 13.0% potassium fluoride.

EXAMPLE VIII

The process of Example I was repeated with the substitution of an electrolyte composed of 60.8% rare earth fluoride, 12.3% barium fluoride, 10.0% lithium fluoride, and 16.9% sodium fluoride.

EXAMPLE IX

The process of Example I was repeated with the substitution of an electrolyte composed of 69.6% rare earth fluoride, 11.4% barium fluoride, 9.0% lithium fluoride, and 10.0% rare earth oxide.

EXAMPLE X

The process of Example I was repeated with the substitution of an electrolyte composed of 66.9% rare earth fluoride, 17.1% barium fluoride, 1.7% calcium fluoride, and 14.3% lithium fluoride.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of producing substantially pure misch metal which comprises electrolytically decomposing a molten electrolyte to form a substantially pure melt of misch metal and mechanically separating the melt from the remaining electrolyte, said electrolyte consisting essentially of an oxide of the elements comprising misch metal dissolved in a major amount of the fluorides of the elements of misch metal and a minor amount of at least one fluoride selected from the group consisting of alkali fluorides and alkaline earth fluorides.

2. A method of producing a substantially pure composite of metallic elements comprising lanthanum, cerium, praseodymium, and neodymium which comprises electrolytically decomposing a molten electrolyte to form a substantially pure melt of said metallic elements and mechanically separating the melt from the remaining electrolyte, said electrolyte consisting essentially of the oxides of rare earth elements dissolved in a major amount of fluorides of rare earth elements and a minor amount of at least one fluoride selected from the group consisting of alkali fluorides and alkaline earth fluorides.

3. A method of producing substantially pure misch metal which comprises electrolytically decomposing oxides of rare earth elements in a molten electrolyte to form a substantially pure melt of misch metal and mechanically separating the melt from the electrolyte, said electrolyte consisting essentially of approximately by weight 60–75% fluorides of rare earth elements, 8–18% at least one alkali fluoride and 8–18% at least one alkaline earth fluoride.

4. A method of producing a composite of substantially pure rare earth elements including lanthanum, cerium, praseodymium and neodyminum which comprises electrolytically decomposing oxides of the rare earth elements dissolved in a molten electrolyte at a sufficient temperature to permit electrodeposition of a substantially pure melt of said rare earth elements and mechanically separating the melt from the molten electrolyte, said electrolyte consisting essentially of a major amount of fluorides of the rare earth elements and a minor amount of at least one fluoride selected from the group consisting of alkali fluorides and alkaline earth fluorides.

5. A method of producing a substantially pure composite of rare earth elements which comprises electrolytically decomposing a molten electrolyte consisting essentially of oxides of rare earth elements dissolved in a mixture consisting of a major amount of fluorides of rare earth elements and a minor amount of at least one fluoride selected from the group consisting of alkali fluoride and alkaline earth fluorides to form a melt of a substantially pure composite of rare earth elements, said melt maintained at a cathodic potential of greater than about three volts, and mechanically separating said melt from the molten electrolyte.

6. A method of producing a substantially pure composite of rare earth elements including lanthanum, cerium, praseodymium and neodymium which comprises electrolytically decomposing a molten electrolyte consisting essentially of oxides of rare earth elements dissolved in a mixture of approximately by weight 60–75% fluorides of rare earth elements, 8–18% at least one alkali fluoride, and 8–18% at least one alkaline earth fluoride to form a melt of the substantially pure composite of the rare earth elements, said melt maintained at a cathodic potential of greater than about three volts, and mechanically separating said melt from the electrolyte.

7. A method of producing misch metal which comprises subjecting a substantially pure oxide compound having misch metal elements as the anion to electrolysis in a bath consisting of a fused mixture of a major amount of fluorides of misch metal elements and a minor amount of at least one fluoride selected from the group consisting of alkali fluorides and alkaline earth fluorides.

8. An electrolytic bath for producing metals of the rare earth group which comprises rare earth oxide dissolved in a fused mixture of a major amount of rare earth fluoride and a minor amount of at least one fluoride selected from the group consisting of alkali fluorides and alkaline earth fluorides.

9. An electrolytic bath for producing metals of the rare earth group which comprises rare earth oxide in a molten mixture of approximately by weight 60–75% rare earth fluoride, 8–18% at least one alkali fluoride, and 8–18% at least one alkaline earth fluoride.

10. An electroytic cell for the production of a composite of rare earth elements which comprises a container having a bottom and side walls interiorly lined with rare earth oxyfluoride for holding an electrolyte within said container, a cover for said container, an anode passing through said cover, and into said container and submerged in an electrolyte, a cathode passing through the container and embedded in the rare earth oxyfluoride near the bottom of said container, and means for periodically removing said composite as it is collected in the bottom of the container without interrupting the operation of the cell.

11. An electrolytic cell for the production of a composite of rare earth elements which comprises a container having a bottom and side walls for holding an electrolyte within said container, said container bottom and side walls interiorly lined with rare earth oxyfluoride, a cover for said container, an anode in the form of an extended rod passing through said cover and into said container for submergence in the electrolyte, a cathode in the form of a plate embedded in the rare earth oxyfluoride lining at the bottom of said container, said cathode so embedded in the rare earth oxyfluoride that the surface of the cathode exposed to the electrolyte and the interior lining of the rare earth oxyfluoride form a continuous smooth surface, and means for periodically removing said composite as it collected in the bottom of the container without interrupting the operation of the cell.

12. In combination with an electrolytic cell for the production of a highly reactive composition utilizing a highly reactive electrolyte and including a container for holding said electrolyte, an interior lining of said container which comprise rare earth oxyfluoride.

13. A method of producing substantially pure misch metal which comprises subjecting monazite to an excess of molten sodium hydroxide, washing the reaction products thereof to liberate oxides of the elements comprising misch metal, dissolving said oxides in an electrolyte, said electrolyte comprising 60–75% rare earth fluoride, 8–18% alkali fluoride, 8–18% alkaline fluoride, and 0–10% rare earth oxide, electrolytically depositing a substantially pure melt of said elements comprising misch metal and mechanically separating the melt from the remaining electrolyte.

14. A method of producing a rare earth oxide in preparation for the production of a substantially pure mischmetal from a rare earth phosphate which comprises the steps of treating a rare earth phosphate with an excess of molten sodium hydroxide in the presence of oxygen, allowing the reaction product to solidify, washing the reaction product with hot water, collecting the residue, said residue comprising a rare earth oxide cooling the remaining sodium hydroxide solution to recover a precipitate of trisodium phosphate from said sodium hydroxide solution.

15. A method of producing substantially pure misch metal which comprises electrolytically decomposing a molten electrolyte to form a substantially pure melt of misch metal and mechanically separating the melt from the remaining electrolyte, said electrolyte consisting essentially of a carbonate of the elements comprising misch metal dissolved in a major amount of the fluorides of the elements of misch metal and a minor amount of at least one fluoride selected from the group consisting of alkali fluorides and alkaline earth fluorides.

16. The method of claim 15 wherein said electrolyte further includes a minor amount of an oxide of the elements comprising misch metal.

17. A method of producing substantially pure misch metal which comprises electrolytically decomposinng carbonates of rare earth elements in a molten electrolyte to form a substantially pure melt of misch metal and mechanically separating the melt from the electrolyte, said electrolyte consisting essentially of approximately by weight 60–75% fluorides of rare earth elements, 8–18% at least one alkali fluoride and 8–18% at least one alkaline earth fluoride.

18. The method of claim 17 wherein said electrolyte further includes a minor amount of an oxide of the elements comprising misch metal.

References Cited

UNITED STATES PATENTS 2,961,387 11/1960 Slatin _____ 204—64
3,062,727 11/1962 Pokorny _____ 204—71 X HOWARD S. WILLIAMS, Primary Examiner.

DONALD R. VALENTINE, Assistant Examiner.